United States Patent
Piironen et al.

(10) Patent No.: US 12,187,580 B2
(45) Date of Patent: Jan. 7, 2025

(54) METHOD, A REMOTE MONITORING UNIT, AND A REMOTE MONITORING SYSTEM FOR REMOTELY RECOVERING AT LEAST ONE PERIPHERAL DEVICE OF A PEOPLE CONVEYOR SYSTEM

(71) Applicant: KONE Corporation, Helsinki (FI)

(72) Inventors: Mikko Piironen, Helsinki (FI); Santtu Koskinen, Helsinki (FI); Mika Belov, Helsinki (FI); Mikko Mattila, Helsinki (FI); Mikko Heiskanen, Helsinki (FI); Ari Koivisto, Helsinki (FI)

(73) Assignee: KONE Corporation, Helsinki (FI)

( * ) Notice: Subject to any disclaimer, the term of this patent is extended or adjusted under 35 U.S.C. 154(b) by 74 days.

(21) Appl. No.: 18/073,124

(22) Filed: Dec. 1, 2022

(65) Prior Publication Data
US 2023/0097627 A1 Mar. 30, 2023

Related U.S. Application Data

(63) Continuation of application No. PCT/FI2020/050425, filed on Jun. 15, 2020.

(51) Int. Cl.
*B66B 25/00* (2006.01)
*B66B 21/10* (2006.01)
*G06F 1/3215* (2019.01)

(52) U.S. Cl.
CPC ............ *B66B 21/10* (2013.01); *G06F 1/3215* (2013.01)

(58) Field of Classification Search
CPC ....... B66B 21/10; B66B 25/00; B66B 25/006; G06F 1/3215

USPC .......................................... 198/321, 322, 323
See application file for complete search history.

(56) References Cited

U.S. PATENT DOCUMENTS

| | | | |
|---|---|---|---|
| 6,267,219 B1 * | 7/2001 | Spannhake | B66B 27/00 198/322 |
| 7,350,626 B2 * | 4/2008 | Lence | B66B 1/3415 187/247 |
| 8,069,958 B2 * | 12/2011 | Lence-Barreiro | B66B 5/0006 187/247 |
| 9,126,806 B2 * | 9/2015 | Joyce | B66B 3/006 |
| 9,580,276 B2 * | 2/2017 | Toutaoui | B66B 5/0025 |
| 10,379,588 B2 * | 8/2019 | Lampe | G06F 1/266 |
| 10,766,745 B2 * | 9/2020 | Gil-Arias | B66B 1/06 |
| 10,906,773 B2 * | 2/2021 | Mustonen | B66B 25/00 |
| 11,040,854 B2 * | 6/2021 | Sudi | B66B 1/06 |
| 11,180,343 B2 * | 11/2021 | Mustonen | B66B 1/3407 |
| 11,662,788 B1 * | 5/2023 | Lindsey | G06F 1/06 713/1 |

(Continued)

FOREIGN PATENT DOCUMENTS

| | | |
|---|---|---|
| EP | 3 415 453 A1 | 12/2018 |
| EP | 3 533 748 A2 | 9/2019 |

*Primary Examiner* — Douglas A Hess
(74) *Attorney, Agent, or Firm* — Birch, Stewart, Kolasch & Birch, LLP

(57) ABSTRACT

A method remotely recovers at least one peripheral device of a people conveyor system. The method includes controlling at least one network element, into which the at least one peripheral device is connected, to control power supply of the at least one peripheral device to remotely recover the at least one peripheral device. The invention relates also to a remote monitoring unit and a remote monitoring system for remotely recovering at least one peripheral device of a people conveyor system.

20 Claims, 3 Drawing Sheets

(56) References Cited

U.S. PATENT DOCUMENTS

2006/0081421 A1  4/2006  Lence et al.
2018/0074562 A1  3/2018  Lampe et al.

\* cited by examiner

METHOD, A REMOTE MONITORING UNIT, AND A REMOTE MONITORING SYSTEM FOR REMOTELY RECOVERING AT LEAST ONE PERIPHERAL DEVICE OF A PEOPLE CONVEYOR SYSTEM

CROSS REFERENCE TO RELATED APPLICATIONS

This application is a Continuation of PCT International Application No. PCT/FI2020/050425, filed on Jun. 15, 2020, all of which is hereby expressly incorporated by reference into the present application.

TECHNICAL FIELD

The invention concerns in general the technical field of people conveyor systems. Especially the invention concerns remote monitoring of one or more entities of people conveyor systems.

BACKGROUND

Typically, people conveyor systems, such as elevator systems, escalator systems and moving walkaway systems, may comprise a plurality of network connected user interface devices and sensor devices. A remote monitoring and controlling of these devices enable efficient maintenance of such devices. However, sometimes such devices may become unable to respond to contact attempts, e.g. status queries and/or recovery attempts, by a remote control unit, e.g. a network management server, via control path and a site visit, by maintenance personnel, is needed to recover the unresponsive devices.

Thus, there is a need to develop further solutions for remote monitoring of one or more entities of the people conveyor systems.

SUMMARY

The following presents a simplified summary in order to provide basic under-standing of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a remote monitoring unit, and a remote monitoring system for remotely recovering at least one peripheral device of a people conveyor system. Another objective of the invention is that the method, the remote monitoring unit, and the remote monitoring system for remotely recovering at least one peripheral device of a people conveyor system enables remote recovery of the at least one peripheral device.

The objectives of the invention are reached by a method and a remote monitoring unit as defined by the respective independent claims.

According to a first aspect, a method for remotely recovering at least one peripheral device of a people conveyor system is provided, wherein the method comprises controlling at least one network element, into which the at least one peripheral device is connected, to control power supply of the at least one peripheral device to remotely recover the at least one peripheral device.

The controlling of the at least one network element may be performed in response to detecting that the at least one peripheral device is unresponsive.

Power supply of the at least one peripheral device of the people conveyor system may be provided via one or more data lines.

Furthermore, the power supply of the at least one peripheral device of the people conveyor system may be provided by using Power over Ethernet (PoE).

The controlling of the at least one network element to control power supply of the at least one peripheral device may comprise power cycling the at least one peripheral device.

Furthermore, the controlling of the at least one network element to power cycle the at least one peripheral device may comprise: generating to the at least one network element a first control request comprising an instruction to power down the at least one peripheral device, and generating to the at least one network element a second control request comprising an instruction to power up the at least one peripheral device.

Alternatively or in addition, the method may further comprise: generating a status query to the at least one peripheral device, and defining a successful recovery of the at least one peripheral device in response to receiving a status response from the at least one peripheral device.

The people conveyor system may be an elevator system, an escalator system, or a moving walkaway system.

According to a second aspect, a remote monitoring unit for remotely recovering at least one peripheral device of a people conveyor system is provided, wherein the remote monitoring unit comprises: a processing unit and a memory unit for storing at least one portion of computer program code, wherein the processing unit being configured to cause the remote monitoring unit at least to control at least one network element, into which the at least one peripheral device is connected, to control power supply of the at least one peripheral device to remote recover the at least one peripheral device.

The control of the one at least one network element may be performed in response to detecting that the at least one peripheral device is unresponsive.

Power supply of the at least one peripheral device of the people conveyor system may be provided via one or more data lines.

Furthermore, the power supply of the at least one peripheral device of the people conveyor system may be provided by using Power over Ethernet (PoE).

The control of the at least one network element to control power supply of the at least one peripheral device may comprise power cycling the at least one peripheral device.

Furthermore, the control of the at least one network element to power cycle the at least one peripheral device may comprise: generation of a first control request comprising an instruction to power down the at least one peripheral device to the at least one network element, and generation of a second control request comprising an instruction to power up the at least one peripheral device to the at least one network element.

Alternatively or in addition, the remote monitoring unit may further be configured to: generate a status query to the at least one peripheral device, and define a successful recovery of the at least one peripheral device in response to receiving a status response from the at least one peripheral device.

The people conveyor system may be an elevator system, an escalator system, or a moving walkaway system.

According to a third aspect, a remote monitoring system for remotely recovering at least one peripheral device of a people conveyor system is provided, wherein the remote monitoring system comprises: at least one network element, into which the at least one peripheral device is connected, and a remote monitoring unit as described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
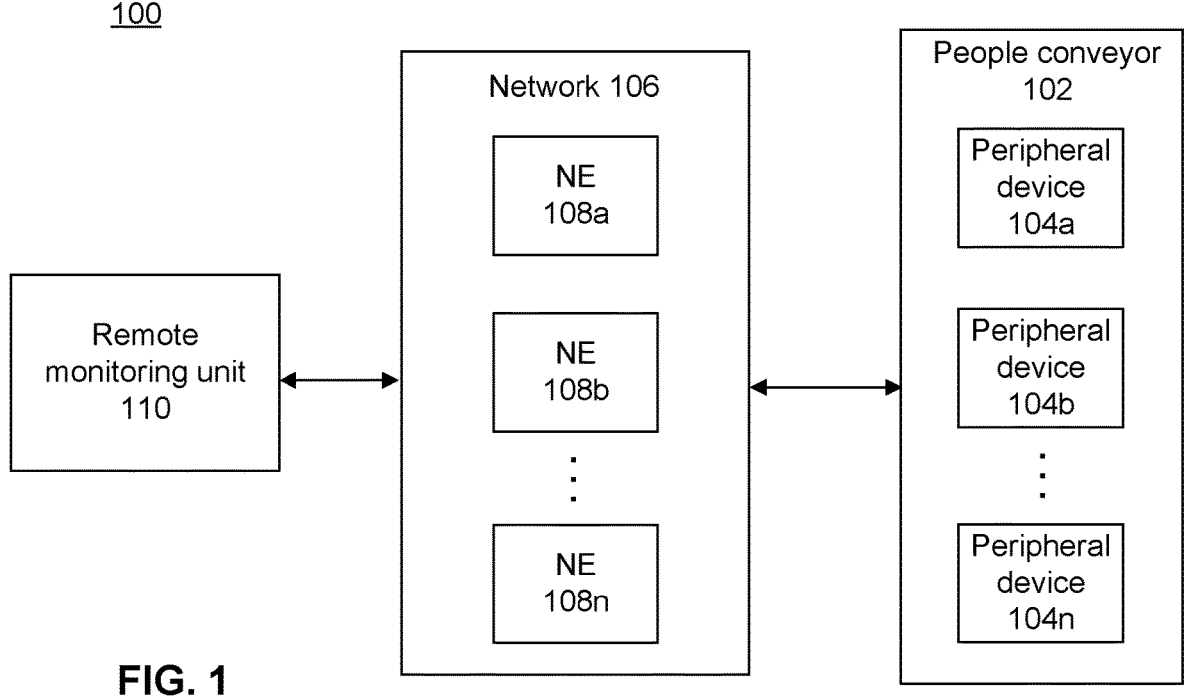
FIG. 1 illustrates schematically an example of a remote monitoring system according to the invention.

FIG. 1 schematically illustrates an example of a remote monitoring system 100 according to the invention. The people conveyor system 102 may be an elevator system, an escalator system, or a moving walkaway system. The people conveyor system 102 may comprise a plurality of peripheral devices 104a-104n. The plurality of peripheral devices 104a-104n may comprise, but is not limited to, one or more sensor devices, e.g. people counting sensors, such as closed-circuit television (CCTV) cameras; one or more user interface devices, e.g. displays, such as infotainment solution displays or any other display systems providing building information, and/or operating panels, such as car operating panel, landing call panel, and/or destination operating panel; and/or one or more communication node devices, e.g. local area network (LAN) switches or wireless access points. The people conveyor system 102 may further comprise one or more known people conveyor related entities. For example, in case of the elevator system the one or more people conveyor related entities may comprise an elevator car, an elevator shaft, hoisting machine, elevator doors, etc. The remote monitoring system 100 comprises a remote monitoring unit 110 and at least one network element (NE) 108a-108n forming a network 106. The network 106 may e.g. Ethernet-based network, such as a local area network (LAN). The plurality of peripheral devices 104a-104n may each be connected to at least one network element 108a-108n, i.e. the plurality of network peripheral devices 104a-104n may be network connected devices. The at least one network element 108a-108n is a manageable logical entity uniting one or more physical devices. The term "network element" means a facility or equipment used in a provision of a telecommunications service including all features, functions and capabilities that are embedded in such facility or equipment. The at least one network element 108a-108n allows the plurality of distributed peripheral devices 104a-104n to be managed in a unified way using one management system, e.g. the remote monitoring system 100. The remote monitoring system 100 is configured to remotely monitor and control, i.e. man-age, the plurality of peripheral devices 104a-104n of the people conveyor system 102. The remote monitoring unit 110 may be configured to control the operations of the remote monitoring system 100. The implementation of the remote monitoring unit 110 may be done as a stand-alone computing entity or as a distributed computing environment between a plurality of stand-alone computing entities, such as a plurality of servers providing distributed computing resource. The remote monitoring unit 110 may be located on-site, i.e. at the people conveyor system 102, or off-site, external to the people conveyor system 102, e.g. cloud server-based remote monitoring unit. Some non-limiting examples of the remote monitoring unit 110 may e.g. a network management service, a people conveyor control service, a people conveyor maintenance service.

Power supply of the plurality of peripheral devices 104a-104n of the people conveyor system 102 may be provided via data lines, e.g. cables, for example by using Power over Ethernet (PoE). The PoE allows that one cable, e.g. a twisted pair cable, may be used to provide both data connection and electric power to each peripheral device 104a-104n connected to the network 106 being an Ethernet-based network such as LAN.

The remote monitoring and controlling of the plurality of peripheral devices 104a-104n may be used for example in maintenance of said plurality of peripheral devices 104a-104n. However, sometimes at least one of the plurality of peripheral devices 104a-104n may be in an abnormal condition, e.g. become unable to respond to contact attempts, e.g. status queries and/or recovery attempts, of the remote monitoring unit 110, i.e. the at least one peripheral device 104a-104n is unresponsive.

Figure 2:
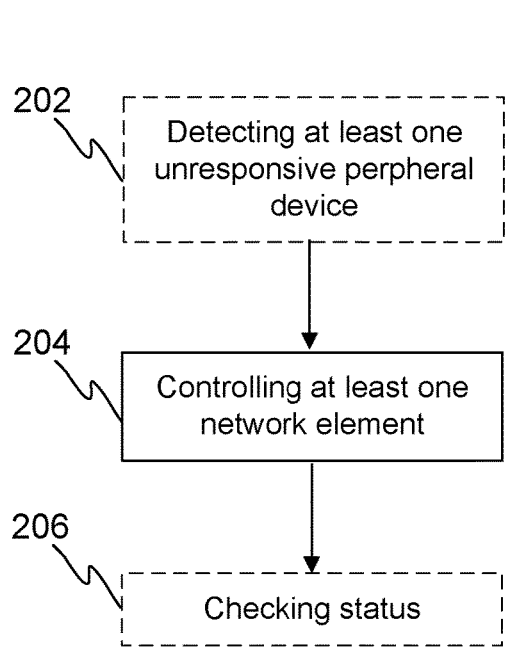
FIG. 2 illustrates schematically an example of a method according to the invention.

Next an example of a method for remotely recovering at least one peripheral device 104a-104n of the people conveyor system 102 according to the invention is described by referring to FIG. 2. FIG. 2 schematically illustrates the invention as a flow chart.

At a step 204, the remote monitoring unit 110 controls at least one network element 108a-108n, into which the at least one peripheral device 104a-104n is connected, to control power supply of the at least one peripheral device 104a-104n to recover the at least one peripheral device 104a-104n.

The remote monitoring unit 110 may perform the controlling of the at least one network element 108a-108n at the step 204 in response to detecting that the at least one peripheral device is unresponsive at a step 202, wherein the remote monitoring unit 110 may detect the at least one unresponsive peripheral device 104a-104n, i.e. the remote monitoring unit 110 may detect an abnormal condition of the at least one peripheral device 104a-104n. The detection of the at least one unresponsive peripheral device 104a-104n at the step 202 may be done with any appropriate monitoring process. For example, the detection at the step 202 may comprise detection that the at least one peripheral device 104a-104n does not response to status queries and/or recovery attempts of the remote monitoring unit 110 within a predefined period of time. The predefined period of time may be defined, e.g. manually defined, or based on a learned baseline, i.e. previous operation and/or performance of the remote monitoring system 100. Alternatively or in addition, the predefined period of time may be based on external requirements. The remote monitoring unit 110 may be configured to occasionally or frequently generate status queries to the plurality of peripheral devices 104a-104n. If at least one peripheral device of the plurality of peripheral devices 104a-104n does not respond to the status query within a first predefined period of time $T_1$, the remote monitoring unit 110 may be configured to generate recovery attempt to said at least one unresponsive peripheral device 104a-104n to recover said at least one unresponsive peripheral device 104a-104n at the initial step 202. The recovery attempt may comprise e.g. generating a recovery request to said at least one unresponsive peripheral device 104a-104n to reset itself. If the at least one unresponsive peripheral devices 104a-104n does not respond to the recovery attempt within a second predefined period of time $T_2$, the remote monitoring unit 110 may detect that the at least one peripheral device 104a-104n is unresponsive, i.e. it has an abnormal condition. The predefined period of time $T_1$ and predefined period of time $T_2$ may be equally long or have different lengths. According to another example, the detection of the at least one unresponsive peripheral device 104a-104n at the step 202 may comprise continuous monitoring, i.e. trending, operation of the plurality of peripheral devices 104a-104n to recognize one or more changes in the operation of at least one peripheral device 104a-104n compared, e.g. to a learned baseline, i.e. previous operation of the plurality of peripheral devices 104a-104n.

Figure 3:
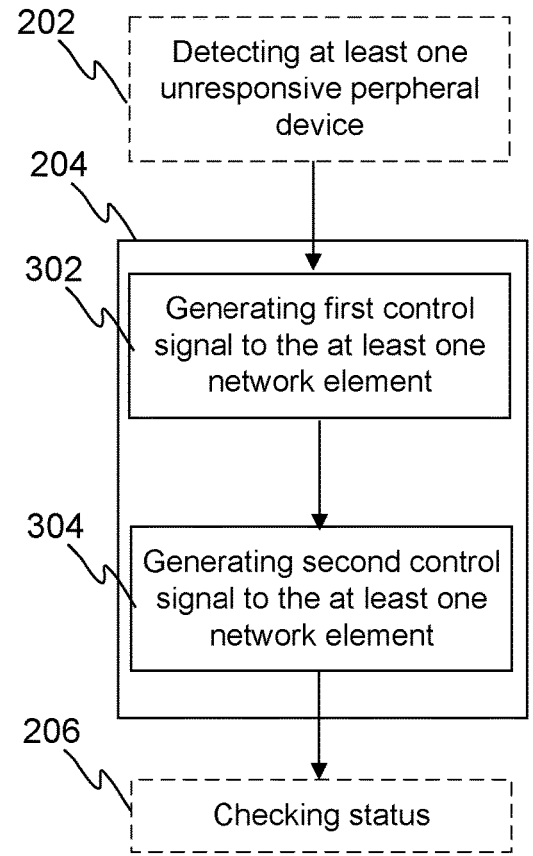
FIG. 3 illustrates schematically another example of a method according to the invention.

FIG. 3 schematically illustrates the flow chart of FIG. 2 in more detailed manner. Especially the step 204 becomes clear from FIG. 3. The controlling of the at least one network element 108a-108n to control the power supply of the at least one peripheral device 104a-104n, i.e. the at least one unresponsive peripheral device 104a-104n, at the step 204 may comprise power cycling, i.e. turning off and back on, the at least one peripheral device 104a-104n. This enables enforcing a remotely initiated power cycle of the at least one peripheral device 104a-104n to recover the at least one unresponsive peripheral device. The controlling 204 of the at least one network element (108a-108n) to power cycle the at least one peripheral device 104a-104n, i.e. the at least one unresponsive peripheral device 104a-104n, at the step 204 may comprise generating 302, by the remote monitoring unit 110, to the at least one network element 108a-108n, into which the at least one peripheral device 104a-104n is connected, a first control request comprising an instruction to power down the at least one peripheral device 104a-104n. In response to receiving the first control request, the at least one network element 108a-108n may power down the at least one peripheral device 104a-104n, i.e. the at least one unresponsive peripheral device 104a-104n. Alternatively, in response to receiving the first control request, the at least one network element 108a-108n may instruct the at least one peripheral device 104a-104n, i.e. the at least one unresponsive peripheral device 104a-104n, to power down itself internally. If the internal powering down is not successful, the at least one network element 108a-108n may then power down the at least one peripheral device 104a-104n. The at least one network element 108a-108n may generate a first acknowledgement message indicating that power down of the at least one peripheral device 104a-104n is completed to the remote monitoring unit 110. The remote monitoring unit 110 may generate 304 to the at least one network element 108a-108n, into which the at least one peripheral device 104a-104n is connected, a second control request comprising an instruction to power up the at least one peripheral device 104a-104n again. The second control request may e.g. be generated in response to receiving the first acknowledgement message from the at least one network element 108a-108n. In response to receiving the second control request, the at least one network element 108a-108n may power up the at least one peripheral device 104a-104n, i.e. the at least one unresponsive peripheral device 104a-104n, again. Alternatively, in response to receiving the second control request, the at least one network element 108a-108n may instruct the at least one peripheral device 104a-104n, i.e. the at least one unresponsive peripheral device 104a-104n, to power up itself again internally. If the internal powering up is not successful, the at least one network element 108a-108n may then power up the at least one peripheral device 104a-104n again. The at least one network element 108a-108n may further generate a second acknowledgement message indicating that power up of the at least one peripheral device 104a-104n is completed to the remote monitoring unit 110.

The method may further comprise checking status 206 of the at least one peripheral device 104a-104n to define a successful recovery of the at least one unresponsive peripheral device 104a-104n, i.e. the at least one unresponsive peripheral device 104a-104n. The checking at the step 206 may comprise generating, by the remote monitoring unit 110 a status query to the at least one peripheral device 104a-104n and defining a successful recovery of the at least one peripheral device 104a-104n in response to receiving a status response from the at least one peripheral device 104a-104n.

The method according to the invention as described above enables that the recovery of the at least one peripheral device 104a-104n may be performed remotely from remote location, i.e. the remote monitoring unit 110, without site visit(s), e.g. by maintenance personnel, to the people conveyor system 102. In addition, the recovery of the at least one peripheral device 104a-104n may include some additional recovery operations requiring operator assistance, e.g. safety related operations.

Figure 4:
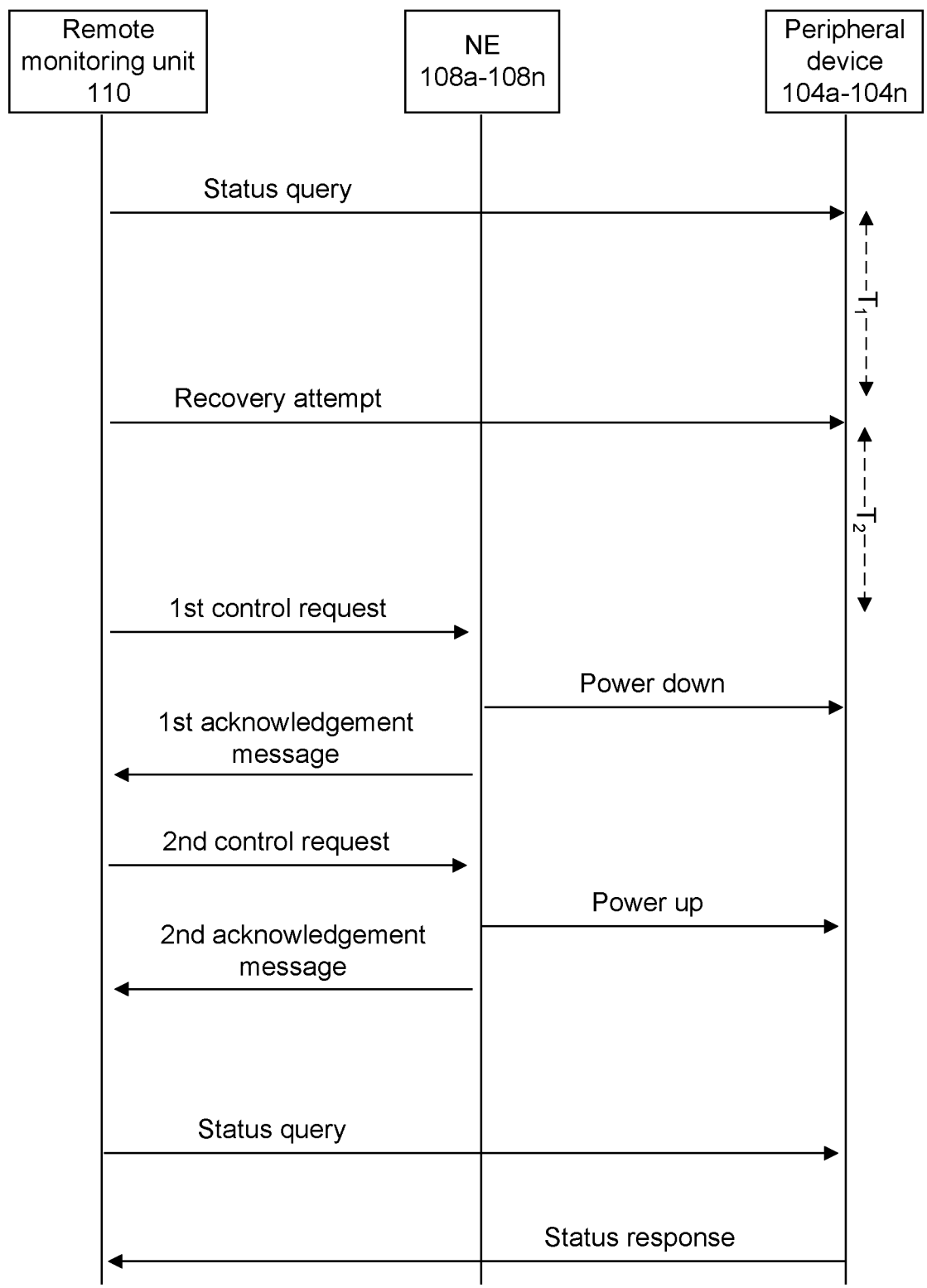
FIG. 4 illustrates schematically an example of communication between different entities of the remote monitoring system according to the invention.

FIG. 4 illustrates schematically an example of the communication between the remote monitoring unit 110, the at least one network element 108a-108n, and the at least one peripheral device 104a-104n during the remotely recovery of the at least one peripheral device 104a-104n of the people conveyor system 102 described above referring to the method according to the invention. In the example of FIG. 4 the remote monitoring unit 110 may be configured to detect the at least one peripheral device 104a-104n is unresponsive by detecting that the at least one peripheral device 104a-104n does not respond to the status query generated by the remote monitoring unit 110 within the predefined first period of time $T_1$ and that the at least one peripheral device 104a-104n does not respond to the recovery attempt of the remote monitoring unit 110 within the predefined second period of time $T_2$. The remote monitoring unit 110 may then be configured to generate to the at least one network element 108a-108n, into which the at least one unresponsive peripheral device 104a-104n is connected, the first control request comprising an instruction to power down the at least one unresponsive peripheral device 104a-104n. In response to receiving the first control request from the remote monitoring unit 110, the at least one network element 108a-108n may be configured to power down the at least one unresponsive peripheral device 104a-104n. Alternatively, in response to receiving the first control request, the at least one network element 108a-108n may instruct the at least one unresponsive peripheral device 104a-104n to power down itself internally. If the internal powering down is not successful, the at least one network element 108a-108n may then power down the at least one unresponsive peripheral device 104a-104n. The at least one network element 108a-108n may be configured to generate the first acknowledgement message indicating that power down of the at least one unresponsive peripheral device 104a-104n is completed to the remote monitoring unit 110. The remote monitoring unit 110 may then be configured to generate to the at least one network element 108a-108n, into which the at least one unresponsive peripheral device 104a-104n is connected, the second control request comprising an instruction to power up the at least one unresponsive peripheral device 104a-104n again. The second control request may be generated in response to receiving the first acknowledgement message from the at least one network element 108a-108n. In response to receiving the second control request from the remote monitoring unit 110, the at least one network element 108a-108n may be configured to power up the at least one unresponsive peripheral device 104a-104n again. Alternatively, in response to receiving the second control request, the at least one network element 108a-108n may instruct the at least one unresponsive peripheral device 104a-104n to power up itself again internally. If the internal powering up is not successful, the at least one network element 108a-108n may then power up the at least one unresponsive peripheral device 104a-104n again. The at least one network element 108a-108n may further be configured to generate the second acknowledgement message indicating that power up of the at least one unresponsive peripheral device 104a-104n is completed to the remote monitoring unit 110. As discussed above, the remote monitoring unit 110 may further be configured to define a successful recovery of the at least one unresponsive peripheral device 104a-104n by generating the status query to the at least one unresponsive peripheral device 104a-104n and defining the successful recovery of the at least one unresponsive peripheral device 104a-104n in response to receiving the status response from the at least one unresponsive peripheral device 104a-104n.

Figure 5:
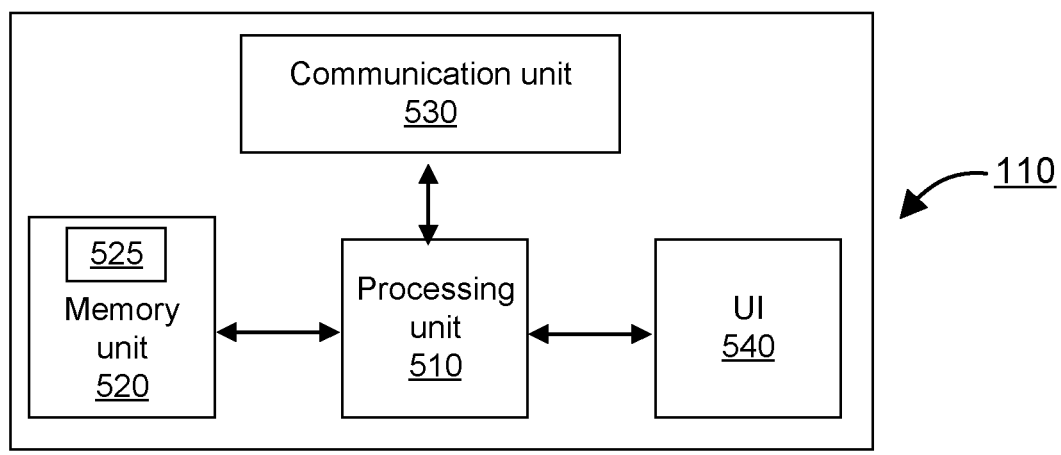
FIG. 5 schematically illustrates an example of components of a remote monitoring unit according to the invention.

FIG. 5 schematically illustrates an example of components of the remote monitoring unit 110 according to the invention. The remote monitoring unit 110 may comprise a processing unit 510 comprising at least one processor, a memory unit 520 comprising at least one memory, a communication unit 530 comprising one or more communication devices, and possibly a user interface (UI) unit 540. The mentioned elements may be communicatively coupled to each other with e.g. an internal bus. The memory unit 520 may store portions of computer program code 525 and any other data. The processing unit 510 of the remote monitoring unit 110 is at least configured to implement at least some method steps as described. The implementation of the method may be achieved by arranging the processing unit 510 to execute at least some portions of the computer program code 525 stored in the memory unit 520 causing the processing unit 510, and thus the remote monitoring unit 110, to implement one or more method steps as described. The at least one processor of the processing unit 510 is thus arranged to access the memory unit 520 and retrieve and store any information therefrom and thereto. For sake of clarity, the processor herein refers to any unit suitable for processing information and control the operation of the remote monitoring unit 110, among other tasks. The operations may also be implemented with a microcontroller solution with embedded software. Similarly, the memory is not limited to a certain type of memory only, but any memory type suitable for storing the described pieces of information may be applied in the context of the present invention. The communication unit 530 may be based on at least one known communication technologies, either wired or wireless, in order to exchange pieces of information as described earlier. The communication unit 530 provides an interface for communication with any external unit, such as the plurality of peripheral devices 104a-104n, the at least one network element 108a-108n, database and/or any external systems. The user interface 540 may comprise I/O devices, such as buttons, keyboard, touch screen, microphone, loudspeaker, display and so on, for receiving input and outputting information. The computer program 525 may be stored in a non-statutory tangible computer readable me-dium, e.g. an USB stick, a memory card, or a CD-ROM disc.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for remotely recovering at least one peripheral device of a people conveyor system, the method comprises
determining, by at least one network element into which at least one peripheral device is connected, that the at least one peripheral device is unresponsive based on the at least one network element not detecting a response to a status query or recovery attempt sent to the peripheral device for a predetermined time; and
controlling the at least one network element to control power supply of the at least one peripheral device to remotely recover the at least one peripheral device in response to the at least one peripheral device being unresponsive.

2. The method according to claim 1, the controlling of the at least one network element is performed in response to detecting that the at least one peripheral device is unresponsive.

3. The method according to claim 2, wherein power supply of the at least one peripheral device of the people conveyor system is provided via one or more data lines.

4. The method according to claim 2, wherein the controlling of the at least one network element to control power supply of the at least one peripheral device comprises power cycling the at least one peripheral device.

5. The method according to claim 1, wherein power supply of the at least one peripheral device of the people conveyor system is provided via one or more data lines.

6. The method according to claim 5, wherein the power supply of the at least one peripheral device of the people conveyor system is provided by using Power over Ethernet (POE).

7. The method according to claim 5, wherein the controlling of the at least one network element to control power supply of the at least one peripheral device comprises power cycling the at least one peripheral device.

8. The method according to claim 1, wherein the controlling of the at least one network element to control power supply of the at least one peripheral device comprises power cycling the at least one peripheral device.

9. The method according to claim 8, wherein the controlling of the at least one network element to power cycle the at least one peripheral device comprises:
generating to the at least one network element a first control request comprising an instruction to power down the at least one peripheral device, and generating to the at least one network element a second control request comprising an instruction to power up the at least one peripheral device.

10. The method according to claim 1, further comprising: generating a status query to the at least one peripheral device, and defining a successful recovery of the at least one peripheral device in response to receiving a status response from the at least one peripheral device.

11. The method according to claim 1, wherein the people conveyor system is an elevator system, an escalator system, or a moving walkaway system.

12. A remote monitoring unit for remotely recovering at least one peripheral device of a people conveyor system, the remote monitoring unit comprising:
a processing unit, and
a memory unit for storing at least one portion of computer program code,
wherein the processing unit being configured to cause the remote monitoring unit at least to control at least one network element, into which the at least one peripheral device is connected, determine that the at least one peripheral device is unresponsive based on the at least one network element not detecting a response to a status query or recovery attempt sent to the peripheral device for a predetermined time, and to control power supply of the at least one peripheral device to remote recover the at least one peripheral device in response to the at least one peripheral device being unresponsive.

13. The remote monitoring unit according to claim 12, wherein the control of the one at least one network element is performed in response to detecting that the at least one peripheral device is unresponsive.

14. The remote monitoring unit according to claim 12, wherein power supply of the at least one peripheral device of the people conveyor system is provided via one or more data lines.

15. The remote monitoring unit according to claim 14, wherein the power supply of the at least one peripheral device of the people conveyor system is provided by using Power over Ethernet (POE).

16. The remote monitoring unit according to claim 12, wherein the control of the at least one network element to control power supply of the at least one peripheral device comprises power cycling the at least one peripheral device.

17. The remote monitoring unit according to claim 16, wherein the control of the at least one network element to power cycle the at least one peripheral device comprises:
generation of a first control request comprising an instruction to power down the at least one peripheral device to the at least one network element, and generation of a second control request comprising an instruction to power up the at least one peripheral device to the at least one network element.

18. The remote monitoring unit according to claim 12, further configured to:
generate a status query to the at least one peripheral device, and define a successful recovery of the at least one peripheral device in response to receiving a status response from the at least one peripheral device.

19. The remote monitoring unit according to claim 12, wherein the people conveyor system is an elevator system, an escalator system, or a moving walkaway system.

20. A remote monitoring system for remotely recovering at least one peripheral device of a people conveyor system, the remote monitoring system comprising:
at least one network element, into which the at least one peripheral device is connected, and a remote monitoring unit according to claim 9.

* * * * *